United States Patent [19]

Dulhunty

[11] 4,159,393
[45] Jun. 26, 1979

[54] VIBRATION DAMPER

[76] Inventor: Philip W. Dulhunty, P.O. Box 156, Wyong, New South Wales, Australia, 2259

[21] Appl. No.: 812,369

[22] Filed: Jul. 1, 1977

[30] Foreign Application Priority Data

Jul. 9, 1976 [AU] Australia ............................. PC6606
Oct. 28, 1976 [AU] Australia ............................. PC7914

[51] Int. Cl.² ............................................. H02G 7/14
[52] U.S. Cl. ............................................. 174/42
[58] Field of Search ................... 174/42; 16/194, 209, 16/216, 1, DIG. 8, 81; 248/364; D8/400; 33/392, 398; 104/175; 191/94; 193/18, 19, 24; 272/122, 123; 43/43.12, 44.81; 24/129 A; 49/387; 292/344

[56] References Cited

U.S. PATENT DOCUMENTS

| | | | |
|---|---|---|---|
| 347,757 | 8/1886 | Crowninshield | 223/100 |
| 783,743 | 2/1905 | D'Olier, Jr. | 24/129 A X |
| 920,620 | 5/1909 | Neely | 223/100 |
| 2,688,047 | 8/1954 | MacIntyre | 174/42 |
| 3,052,747 | 9/1962 | Clark et al. | 174/42 |
| 3,400,209 | 9/1968 | Minyu et al. | 174/42 |
| 3,711,624 | 1/1973 | Dulhunty | 174/42 |
| 3,744,177 | 7/1973 | Cron, Jr. | 43/43.12 |

FOREIGN PATENT DOCUMENTS

| | | | |
|---|---|---|---|
| 546134 | 9/1957 | Canada | 174/42 |
| 44-994 | 1/1969 | Japan | 174/42 |
| 44-17236 | 7/1969 | Japan | 174/42 |
| 783813 | 10/1957 | United Kingdom | 33/392 |

*Primary Examiner*—Laramie E. Askin
*Attorney, Agent, or Firm*—Weingarten, Maxham & Schurgin

[57] ABSTRACT

A vibration damper comprising a resilient messenger cable having a clamp intermediate its ends for securing it to a conductor. The cable has a weight secured to each end thereof, the center of gravity of each of the weights being disposed away from the axis of the cable. Each of the weights comprises an enlarged head portion attached to the ends of the cable, an arm extending from the head portion in a generally inward direction and a further mass supported at the distal end of the arm, the further mass being smaller in size and weight than the head portion. The size and placement of the further mass produces substantial local flexing of the messenger cable adjacent the innermost point of contact of the cable with the weight when the weight oscillates about its center of gravity.

17 Claims, 10 Drawing Figures

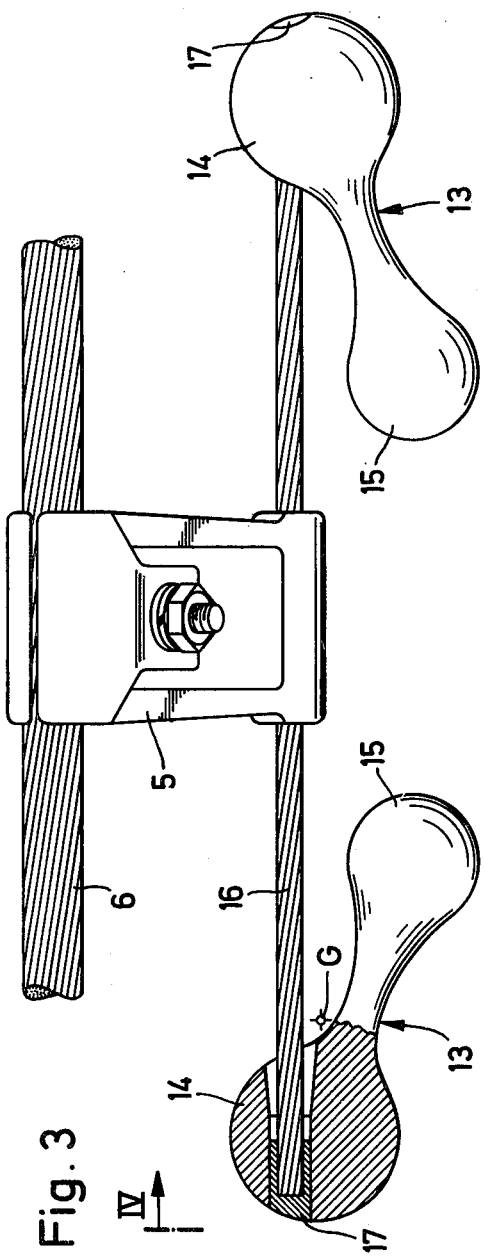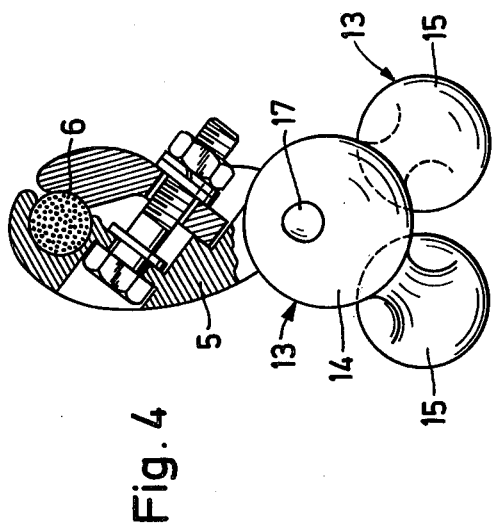

VIBRATION DAMPER

This invention relates to overhead cable vibration dampers and in particular to the well known "Stockbridge" type damper.

Fundamentally, a Stockbridge damper comprises a resilient messenger cable clamped to the overhead cable so as to be spaced therefrom, the messenger cable having one or more weights secured thereto on each side of the clamping device.

Such simple Stockbridge dampers have a single resonant frequency and this reduces the effective frequency range of the Aeolian or other vibrations in the overhead cable which it is intended to absorb or counteract. The single resonant frequency is defined by the vibrations of the messenger cable in a mode in which the maximum transverse deflection from an equilibrium position occurs at the distal end of each cable.

In an attempt to increase the effective frequency range of the damper, specially shaped weights have been used. In particular, a bell-shaped weight comprising a heavy head portion and a tubular skirt extending therefrom. In use, the messenger cable extends axially through the skirt and is secured in position by direct casting onto the messenger cable or by a tapered wedge or other suitable means.

A bell-shaped weight as discussed above has its centre of gravity disposed in the hollow space to one side of the head of the weight within the skirt. That is to say, the centre of gravity falls within the messenger cable inside the skirt of the weight. Under those circumstances, two modes of vibration are possible: namely, the mode of vibration in which the weight moves as a whole with flexure of the messenger cable occurring throughout its length and a second mode of vibration in which the weight itself oscillates about its centre of gravity with substantial local flexing of the messenger cable adjacent its point of attachment to the weight.

As a result of the additional possible mode of vibration, the number of resonant frequencies and the frequency range of the damper as a whole is extended, the oscillation of the weight about its own centre of gravity tending to produce a node in the messenger cable at or near its distal end.

Such weights are, however, difficult to cast in view of their hollow construction. Furthermore, the hollow space is undesirable in that it can collect moisture or other foreign material which tends to detract from the predicted performance of the damper and may shorten its serviceable life. This is particularly the case where the damper may be exposed to freezing conditions.

It is an object of the present invention to provide a vibration damper having a weight shape which is less subject to these disadvantages and which, in preferred arrangements, can induce a torsional mode of vibration with a resulting improvement to the frequency response curve.

According to the invention there is provided a vibration damper comprising a resilient messenger cable having a clamp at a position intermediate its ends for securing it to a conductor, the cable having a weight secured at each end thereof, the centre of gravity of each of the weights being disposed away from the axis of the cable. Each of the weights comprises an enlarged head portion attached to the messenger cable, an arm extending from the head portion in a generally inward direction and a further mass supported at the distal end of the arm, the further mass being smaller in size and weight than the head portion, but being of such size and placement that substantial local flexing of the messenger cable is produced adjacent the innermost point of contact of the cable with the weight when the weight oscillates about its centre of gravity. Specifically, the weight of this invention comprises concentrated spaced masses as opposed to being elongated distributed weights.

In a preferred embodiment, both the head portion and further mass are generally spherical with the weight being smoothly contoured in transition from the head portion to the further mass. In any of the disclosed embodiments it is preferred that the end of both the messenger cable and the arm be smoothly rounded, as by the attachment of the weight which creates the desired generally rounded ends. This reduces the likelihood of corona discharge from the vibration damper when in use.

Preferred embodiments of the invention will now be described, by way of example only, with reference to the accompanying drawings in which:

FIG. 3 is a sectional side elevation of a particularly preferred form of vibration damper according to the invention;

FIG. 4 is a partly sectioned end elevation of the vibration damper shown in FIG. 3 taken in the direction of arrow IV illustrating the relative angular disposition of the weights;

Figure 1:
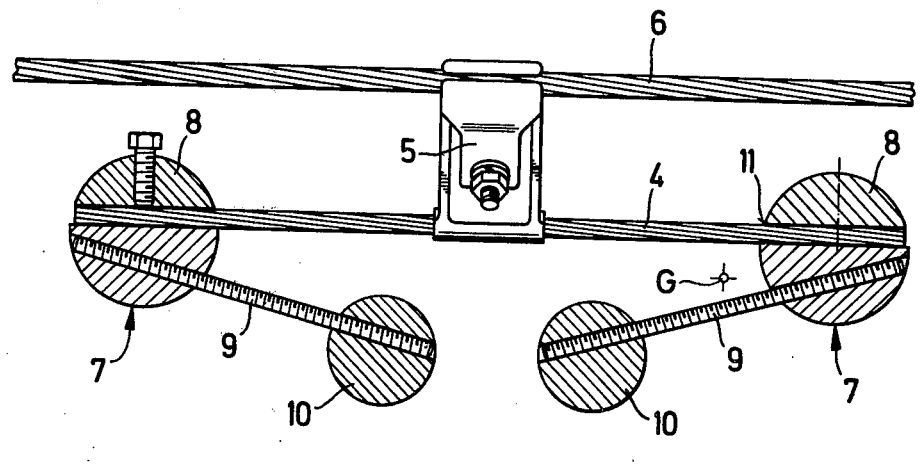
FIG. 1 is a sectional side elevation of a vibration damper according to the invention, attached to a conductor cable.
Figure 7:
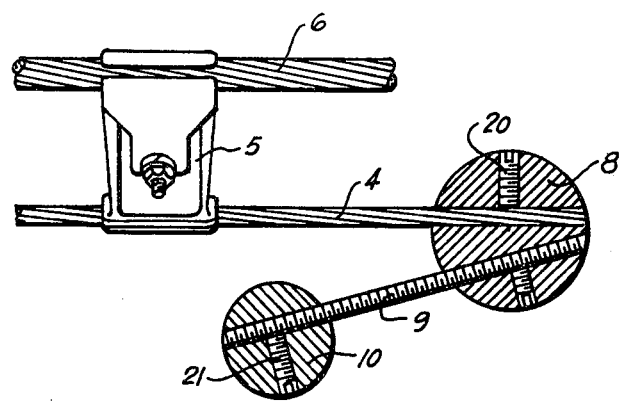
FIGS. 7 and 8 are partial sectional side elevations similar to FIG. 1 but illustrating the manner in which the weights of that embodiment may be adjusted.
Figure 8:
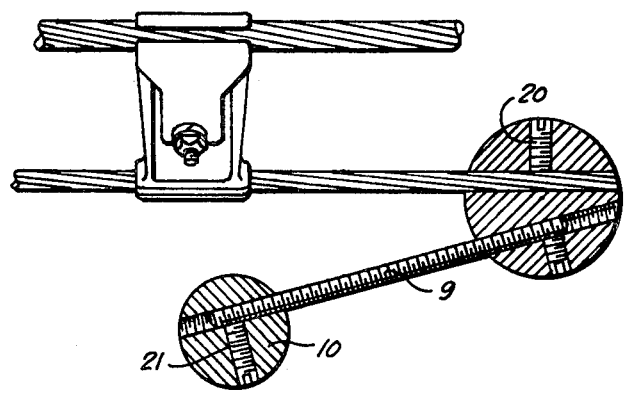

Referring initially to FIGS. 1, 7 and 8 of the drawings, the vibration damper comprises a resilient messenger cable 4 having a clamp 5 intermediate its ends for securing it to a conductor cable 6. The messenger cable 4 is preferably of a high-hysteresis type. Located at opposite ends of the messenger cable are two composite weights 7, each having a spherical head portion 8. The weights are preferably of zinc but may be formed of any suitable material. Extending from the head portion 8 of each weight is an arm in the form of a rod 9 which is preferably threaded but need not be, and which mounts a smaller spherical mass 10 at its distal end. In a modified form, the rod 9 may be replaced by a stranded messenger cable of predetermined stiffness. The head portion 8 may be secured to the messenger cable by a tapered collet, locking screw or other suitable means.

As best shown in FIGS. 7 and 8, the point of attachment of the weight to the messenger cable can be varied by moving the head portion 8 along the cable and securing it in position when the required location has been found. Any suitable securing means may be used such as the illustrated set screw 20. Similarly, the smaller mass 10 can be screwed along the threaded rod 9 and secured in any desired position by set screw 21 or other suitable means.

Clearly the smaller mass can be moved relative to the head portion and fixed in any one of a plurality of spaced positions while remaining at the distal end of rod 9. This is important if corona discharge problems are to be minimized since these effects are accentuated in the region of sharp projections such as would occur if the rod 9 were to project from the weight 10. FIGS. 7 and 8 therefore illustrate positions of maximum and minimum spacing for a given length of rod consonant with desirable corona discharge characteristics.

It will be apparent that the centre of gravity (G) of each weight 7 is spaced from the axis of the messenger cable 4 and is disposed wholly inwardly of the innermost point of contact 11 of the messenger cable with the weight 7 in the preferred embodiment of the invention. By "inwardly" is meant in that direction proceeding from the distal end towards the position intermediate the ends of the messenger cable. In this way, the oscillation of the weight about its centre of gravity will cause substantial local bending of the messenger cable in this region and provide an improved frequency response. Furthermore, if the centre of gravity G is also spaced to one side of the messenger cable axis, the torsional effect imposed upon the messenger cable by virtue of the eccentrically disposed centre of gravity provides a further improvement in the frequency response of the damper. In this case, the centre of gravity of each weight is preferably disposed on the opposite side of the messenger cable to that of the other.

Figure 5:
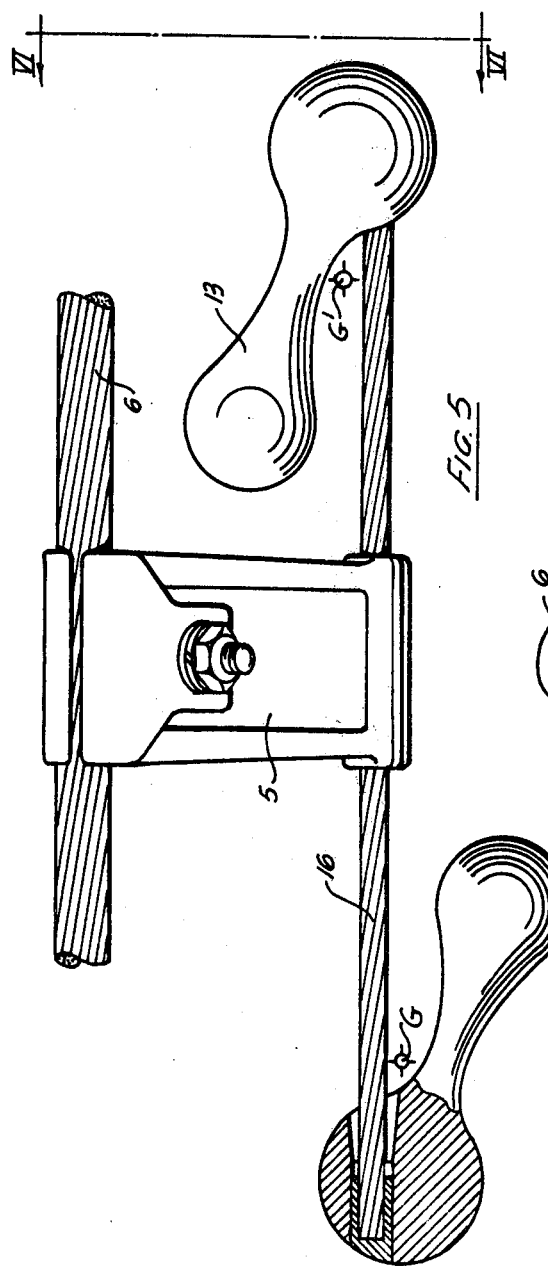
FIG. 5 is a view similar to FIG. 3 illustrating a different arrangement of the weights.
Figure 6:
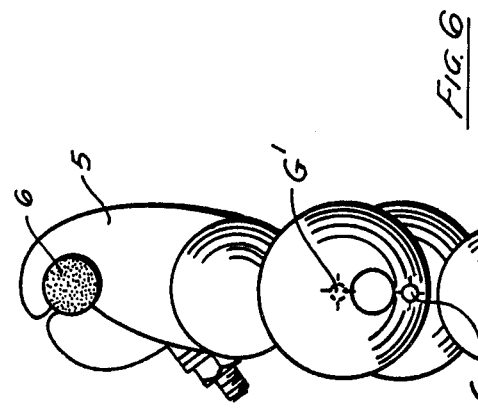
FIG. 6 is an end elevation of the vibration damper shown in FIG. 5, taken in the direction of the arrows VI—VI.

The centre of gravity of one or both weights may be disposed directly above or directly beneath the messenger cable. As illustrated in FIGS. 5 and 6, the centre of gravity G of one weight 13 is disposed directly beneath the messenger cable 16 while the centre of gravity G' of the other weight is disposed directly above the messenger cable.

The centre of gravity may fall slightly outwardly of point 11 without substantial detriment but the effectiveness of the damper diminishes as the centre of gravity moves past this point due to the reduction in the localised bending of the messenger cable which occurs as a result.

Since the Aeolian vibrations induced in the conductor wire manifest themselves predominantly in a vertical plane, the amount of torsion applied to the messenger cable 4 can be varied by rotating the weight head portion 8 about the messenger cable and securing it in any desired angular position. Preferably, the smaller weight 10 is eccentrically mounted as shown such that the amount of torsion exerted on the rod 9 or stranded messenger cable can be varied by rotation of the weight 10 about the rod in the same way as the head portion 8 can be rotated about the messenger cable 4.

Even in the case where the centre of gravity is disposed directly above or beneath the messenger cable such that only a relatively minor (if any) torsional influence is felt, it has been found that the arrangement provides a fluctuating tensile stress in the main messenger cable which is beneficial to the frequency response curve.

Figure 2:
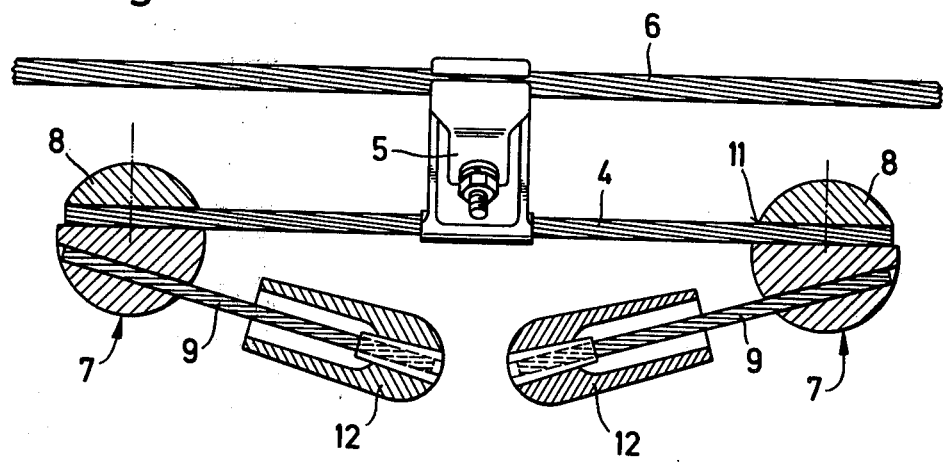
FIG. 2 is a view similar to FIG. 1 but showing an alternative weight combination.

It will be appreciated that a vibration damper weight according to the invention need not be constructed as shown in FIG. 1. An alternative but less preferred composite weight is illustrated in FIG. 2 where the smaller weight 10 is replaced with a conventional bell-shaped weight 12. In further modifications, the weights 10 or 12 can be eliminated.

Figure 9:
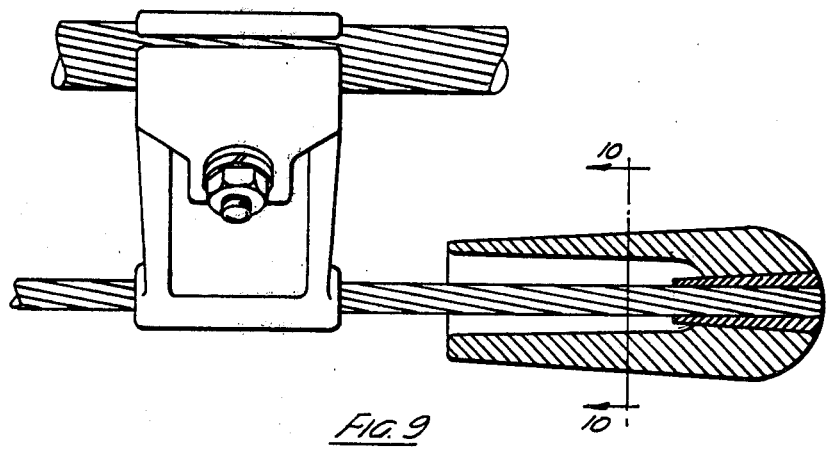
FIG. 9 is a view similar to FIG. 7 showing an alternative embodiment.
Figure 10:
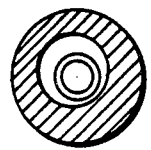
FIG. 10 is a sectional view taken along cutting plane 10—10 in FIG. 9.

In yet another form, either the larger or the smaller weight mass may be bell-shaped in the conventional manner but adapted to be secured to the messenger cable such that this cable is spaced from the axis of the bell. Alternatively, as shown in FIGS. 9 and 10 the weight may be bell-shaped and adapted for attachment to the messenger cable co-axially with the bore of the bell with the wall thickness arranged to vary such that more weight is disposed on one side of the messenger cable than on the other side.

A particularly preferred weight shape is illustrated in FIGS. 3, 4, 5 and 6 where each weight 13 is derived from the shape illustrated in FIG. 1 by providing a smoothly contoured transition from a generally spherical head portion 14 to a generally spherical distal mass 15. The smoothly contoured surface reduces the incidence of corona effects while the substantially solid weight is not as susceptible to the accumulation and freezing of water, as is the case with the bell-shaped weights illustrated in FIG. 2.

Each weight 14 is secured to the messenger cable 16 by any suitable means such as a collet 17 and arranged such that the centre of gravity G of each weight is disposed beneath and on the opposite side of the messenger cable to that of the other, as shown in FIG. 4. The weights may alternatively be attached by set screws or by a press fit on the cable or even by direct casting onto the cable.

Although the invention has been described with reference to specific examples, it will be appreciated that the invention may be embodied in many other forms without departing from the scope of the inventive concept.

I claim:

1. A vibration damper comprising:
    a resilient messenger cable of predetermined length;
    a clamp means at a position intermediate the ends of said messenger cable for securing said messenger cable to a conductor; and
    two weight means, one of said weight means being secured to each end of said messenger cable, the centre of gravity of each of said weight means being located away from the axis of said messenger cable, each of said weight means being in the form of two concentrated spaced masses comprising:
    an enlarged head portion attached to a said end of said messenger cable;
    a connecting member extending from said head portion in a direction away from said messenger cable and generally inward toward said intermediate position; and
    a further mass on said connecting member at the distal end thereof, said further mass being smaller in size and weight than said head portion;
    said weight means producing substantial local flexing of said messenger cable adjacent the innermost point of contact of said messenger cable with said weight means when said weight means oscillates about its centre of gravity.

2. The vibration damper recited in claim 1 wherein said head portion and said further mass are substantially solid.

3. The vibration damper as recited in claim 2 wherein said head portion and said further mass are generally spherical and said connecting member on each of said weight means is smoothly contoured in transition from said head portion to said further mass.

4. The vibration damper as recited in claim 1 wherein said connecting member comprises a resilient cable thereby allowing said further mass to oscillate about said head portion.

5. The vibration damper as recited in claim 1 wherein said connecting member comprises a rod.

6. The vibration damper as recited in claim 1 wherein each said weight means comprises:
   means for moving said further mass relative to said head portion along said connecting member; and
   means for fixing said further mass in any one of a plurality of positions spaced relative to said head portion while remaining substantially at the distal end of said connecting member.

7. The vibration damper as recited in claim 6 wherein said moving means comprises threads for engaging said connecting member with said further mass.

8. The vibration damper as recited in claim 1 wherein said further mass is eccentrically mounted to said connecting member.

9. The vibration damper as recited in claim 1 wherein said further mass comprises a substantially bell-shaped weight.

10. The vibration damper as recited in claim 1 wherein the centre of gravity of at least one of said weight means is disposed below and to one side of the axis of said messenger cable.

11. The vibration damper as recited in claim 1 wherein the centre of gravity of each of said weight means is disposed below and to one side of the axis of said messenger cable and wherein the centre of gravity of one of said weight means is disposed on the opposite side of said cable to that of the other of said weight means.

12. The vibration damper as recited in claim 1 wherein the centre of gravity of at least one of said weight means is disposed directly beneath said messenger cable.

13. The vibration damper as recited in claim 1 wherein the centres of gravity of both of said weight means are disposed directly beneath said messenger cable.

14. The vibration damper as recited in claim 1 wherein the centre of gravity of at least one of said weight means is disposed directly above said messenger cable.

15. The vibration damper as recited in claim 1 wherein the centres of gravity of both of said weight means are disposed directly above said messenger cable.

16. The vibration damper as recited in claim 1 wherein the centre of gravity of one of said weight means is disposed directly beneath said messenger cable and the centre of gravity of the other of said weight means is disposed directly above said messenger cable.

17. The vibration damper as recited in claim 1 wherein said enlarged head portion of said weight means is substantially bell-shaped and secured substantially co-axially to said messenger cable, said enlarged head having an angularly varying wall thickness with respect to the axis thereof.

* * * * *